(12) United States Patent
Yoshiyuki et al.

(10) Patent No.: US 11,772,767 B2
(45) Date of Patent: Oct. 3, 2023

(54) OUTBOARD MOTOR

(71) Applicant: SUZUKI MOTOR CORPORATION, Hamamatsu (JP)

(72) Inventors: Masato Yoshiyuki, Hamamatsu (JP); Norifumi Taiencho, Hamamatsu (JP); Sho Okamoto, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 534 days.

(21) Appl. No.: 17/104,793

(22) Filed: Nov. 25, 2020

(65) Prior Publication Data

US 2021/0188413 A1    Jun. 24, 2021

(30) Foreign Application Priority Data

Dec. 20, 2019 (JP) ................. 2019-230353

(51) Int. Cl.
*B63H 20/20* (2006.01)
*F16H 57/04* (2010.01)
(Continued)

(52) U.S. Cl.
CPC ............ *B63H 20/20* (2013.01); *F16C 3/02* (2013.01); *F16C 33/6659* (2013.01); *F16C 33/6685* (2013.01); *F16H 3/145* (2013.01); *F16H 57/0424* (2013.01); *F16H 57/0428* (2013.01); *F16H 57/0435* (2013.01); *F16H 57/0457* (2013.01); *F16H 57/0471* (2013.01); *F16H 57/0494* (2013.01)

(58) Field of Classification Search
CPC ........ B63H 20/20; F16C 3/02; F16C 33/6659; F16C 33/6685; F16C 2326/30; F16C 2361/61; F16C 37/007; F16H 3/145; F16H 57/0424; F16H 57/0428; F16H 57/0435; F16H 57/0457; F16H 57/0471; F16H 57/0494
See application file for complete search history.

(56) References Cited

U.S. PATENT DOCUMENTS

2008/0014804 A1\* 1/2008 Asakaze .............. B63H 20/002
                                                              440/49
2013/0052891 A1\* 2/2013 Yoshigasaki .......... B63H 21/38
                                                              440/88 L
(Continued)

FOREIGN PATENT DOCUMENTS

JP          2018-177166 A    11/2018

*Primary Examiner* — Andrew Polay
(74) *Attorney, Agent, or Firm* — Stein IP, LLC

(57) ABSTRACT

An outboard motor includes an oil passage that through which an oil flows from the shift chamber to a gear chamber. A circular recessed portion is formed on an upper surface of the gear chamber. A rectangular recessed portion communicating with the circular recessed portion is formed on a portion of the upper surface adjacent to the circular recessed portion. The rectangular recessed portion includes a front surface facing a side surface of the circular recessed portion, a left surface located on a reverse side of a rotation direction of the drive gear with respect to the front surface, and a right surface located on a side of the rotation direction with respect to the front surface. An outlet of the oil passage is arranged on the front surface at a position closer to the left surface than to the right surface.

6 Claims, 6 Drawing Sheets

(51) Int. Cl.
    *F16C 3/02*     (2006.01)
    *F16C 33/66*     (2006.01)
    *F16H 3/14*     (2006.01)

(56) References Cited

U.S. PATENT DOCUMENTS

2018/0306306 A1* 10/2018 Hamada .............. F16H 57/0435
2022/0297814 A1* 9/2022 Mihara ................ B63H 20/002

* cited by examiner

OUTBOARD MOTOR

CROSS-REFERENCE TO RELATED APPLICATIONS

This application is based on Japanese Patent Application No. 2019-230353 filed on Dec. 20, 2019, the contents of which are incorporated herein by way of reference.

BACKGROUND

The present disclosure relates to an outboard motor including a structure that lubricates a gear connecting shafts and a bearing rotatably supporting the shafts.

The outboard motor includes an engine (internal combustion engine, electric motor, and the like), a propeller shaft, a drive shaft that transmits the power of the engine to the propeller shaft, a gear device that connects the drive shaft and the propeller shaft, and a shift device that switches gears of the gear device to switch a rotation direction of the propeller shaft. Further, the propeller shaft is accommodated in a lower case provided at a lower portion of the outboard motor. Further, a shift chamber and a gear chamber are provided in the lower case so as to be adjacent to each other in a front-back direction, the shift device is accommodated in the shift chamber, and the gear device is accommodated in the gear chamber. In addition, in the lower case, a drive shaft insertion hole through which a lower end side portion of the drive shaft extending in an up-down direction from the engine to the gear device is inserted is provided.

In the lower case of the outboard motor, an oil circulation mechanism that circulates oil for lubricating and cooling a bearing that rotatably supports the propeller shaft, a bearing that rotatably supports the drive shaft, the gears of the gear device, a clutch of the shift device and the like is provided. That is, the oil for lubricating and cooling the bearings, the gears, the clutch and the like is stored in the gear chamber and the shift chamber. In addition, in the lower case, passages through which the oil flows are separately secured between the gear chamber and a lower end side portion of the drive shaft insertion hole, between an upper end side portion of the drive shaft insertion hole and the shift chamber, between the shift chamber and the gear chamber and the like. When the outboard motor is in operation, basically, the oil circulates through the passages in the order of the gear chamber, the drive shaft insertion hole, the shift chamber, and the gear chamber so as to lubricate and cool the bearings, the gears, the clutch and the like.

Patent Document 1 below describes an example of an outboard motor equipped with such an oil circulation mechanism.

Patent Document 1: JP-A-2018-177166

SUMMARY

The temperature of the oil rises due to frictional heat generated from the bearings or gears. If the temperature of the oil becomes high, the oil deteriorates prematurely, and therefore, it is necessary to cool the oil.

Usually, the oil is cooled by the lower case while circulating in the lower case. However, depending on the type of the outboard motor, such as a large outboard motor or a high-power outboard motor, an amount of heat generated from the bearings or gears may be large, and the temperature of the oil may be greatly increased. For such an outboard motor, it is possible to reduce the temperature rise of the oil by forming a bypass passage of the oil in the lower case and increasing a circulation path of the oil. That is, by increasing the circulation path of the oil, the oil circulation can be improved, and therefore, it is possible to improve the oil cooling efficiency. By increasing the oil cooling efficiency in this way, the oil can be sufficiently cooled even when the temperature of the oil greatly rises.

Specifically, a bearing that rotatably supports a front end side portion of the propeller shaft is arranged between the shift chamber and the gear chamber. Normally, the oil in the shift chamber moves into the gear chamber through a gap (the gap between an inner ring and an outer ring of bearing) in the bearing. However, in order to improve the oil cooling efficiency, a flow rate of the oil moving from the shift chamber to the gear chamber is insufficient only by passing the oil through the gap in the bearing. Therefore, a bypass passage is formed in the partition between the shift chamber and the gear chamber, which is located above the bearing, and the oil is passed through both the bypass passage and the gap in the bearing. As a result, the flow rate of the oil moving from the shift chamber to the gear chamber can be increased.

However, such a structure has the following problems.

An inlet of the bypass passage opens into the shift chamber and an outlet of the bypass passage opens into the gear chamber. The bypass passage is inclined so that the inlet thereof is located higher than the outlet thereof. When the outboard motor is in operation, the oil in the shift chamber flows into the bypass passage and flows by gravity through the bypass passage toward the gear chamber. On the other hand, when the outboard motor is operating, the gears of the gear device rotate in the gear chamber, and the gears stir the oil stored in the gear chamber. A part of the stirred oil flows into the bypass passage from the outlet of the bypass passage and tries to flow backward in the bypass passage against gravity. Alternatively, a part of the stirred oil stays near the outlet of the bypass passage and closes the outlet of the bypass passage. In such a case, the oil flowing in the bypass passage from the shift chamber toward the gear chamber collides with the oil that tries to flow backward in the bypass passage or the oil staying near the outlet of the bypass passage. As a result, the oil may not smoothly flow from the shift chamber to the gear chamber via the bypass passage. That is, even if the bypass passage is formed in the partition between the shift chamber and the gear chamber, which is located above the bearing, in order to improve the oil cooling efficiency, the flow rate of the oil moving from the shift chamber to the gear chamber cannot be sufficiently increased.

The present disclosure has been made in view of the above-described problems, and an object of the present disclosure is to provide an outboard motor in which oil can be smoothly moved from a shift chamber to a gear chamber through an oil passage formed between the shift chamber and the gear chamber, such that oil circulation can be improved and oil cooling efficiency can be increased.

In order to solve the above problems, according to a first aspect of an outboard motor of the present disclosure, an outboard motor includes an engine; a propeller shaft that is provided below the engine and extends in a front-back direction; a drive shaft that extends in an up-down direction between the engine and the propeller shaft, and is configured to transmit power of the engine to the propeller shaft; a gear device that includes a drive gear configured to rotate with an axis of the drive shaft as a rotation axis, a forward gear configured to rotate with an axis of the propeller shaft as a rotation axis and transmit rotation of the drive shaft to the propeller shaft to rotate the propeller shaft in a positive direction, and a reverse gear configured to rotate with the axis of the propeller shaft as a rotation axis and transmit the rotation of the drive shaft to the propeller shaft to rotate the propeller shaft in a reverse direction; a shift device that is configured to select an either the forward gear or the reverse gear as a gear for transmitting the rotation of the drive gear to the propeller shaft, and set a rotation direction of the propeller shaft; and a case that accommodates the gear device and the shift device. A gear chamber accommodating the gear device, a shift chamber accommodating the shift device, and an oil circulation mechanism configured to circulate oil in the gear chamber and the shift chamber are provided in the case. The oil circulation mechanism includes an oil passage that communicates with the gear chamber and the shift chamber with each other, and through which the oil flows from the shift chamber to the gear chamber. A circular recessed portion includes an opening portion having a circular shape, accommodates the drive gear, and is formed on an upper wall surface of the gear chamber. A rectangular recessed portion includes an opening portion having a rectangular shape, communicates with the circular recessed portion, and is formed on a portion of the upper wall surface of the gear chamber adjacent to the circular recessed portion. The rectangular recessed portion includes a first side wall surface facing a side surface of the circular recessed portion, a second side wall surface located on a reverse side of a rotation direction of the drive gear with respect to the first side wall surface, and a third side wall surface located on a side of the rotation direction of the drive gear with respect to the first side wall surface. An outlet of the oil passage is arranged on the first side wall surface at a position closer to the second side wall surface than to the third side wall surface.

According to a second aspect of an outboard motor of the present disclosure, an outboard motor includes an engine; a propeller shaft that is provided below the engine and extends in a front-back direction; a drive shaft that extends in an up-down direction between the engine and the propeller shaft, and is configured to transmit power of the engine to the propeller shaft; a gear device that includes a drive gear configured to rotate with an axis of the drive shaft as a rotation axis, a forward gear configured to rotate with an axis of the propeller shaft as a rotation axis and transmit rotation of the drive shaft to the propeller shaft to rotate the propeller shaft in a positive direction, and a reverse gear configured to rotate with the axis of the propeller shaft as a rotation axis and transmit the rotation of the drive shaft to the propeller shaft to rotate the propeller shaft in a reverse direction; a shift device that is configured to select an either the forward gear or the reverse gear as a gear for transmitting the rotation of the drive gear to the propeller shaft and set a rotation direction of the propeller shaft; and a case that accommodates the gear device and the shift device. A gear chamber accommodating the gear device, a shift chamber accommodating the shift device, and an oil circulation mechanism configured to circulate oil in the gear chamber and the shift chamber are provided in the case. The oil circulation mechanism includes an oil passage that communicates with the gear chamber and the shift chamber with each other, and through which the oil flows from the shift chamber to the gear chamber. A circular recessed portion includes an opening portion having a substantially circular shape, accommodates the drive gear, and is formed on an upper wall surface of the gear chamber. A rectangular recessed portion includes an opening portion having a substantially rectangular shape, communicates with the circular recessed portion, and is formed on a portion of the upper wall surface of the gear chamber adjacent to the circular recessed portion. The rectangular recessed portion includes a first side wall surface facing a side surface of the circular recessed portion, a second side wall surface located on a reverse side of a rotation direction of the drive gear with respect to the first side wall surface, and a third side wall surface located on a side of the rotation direction of the drive gear with respect to the first side wall surface. When the upper wall surface of the gear chamber is viewed from below, assuming that a point at which an edge portion of the circular recessed portion intersects with an edge portion of the second side wall surface is a point P, a circle passing through an outermost peripheral portion of the drive gear is a circle Q, and a tangent to the circle Q passing through the point P and being located on the reverse side of the rotation direction of the drive gear with respect to the point P is a straight line T, at least a part of an outlet of the oil passage is located on the first side wall surface at the reverse side of the rotation direction of the drive gear than the straight line T.

DETAILED DESCRIPTION OF EXEMPLIFIED EMBODIMENTS

First Embodiment

Figure 1:
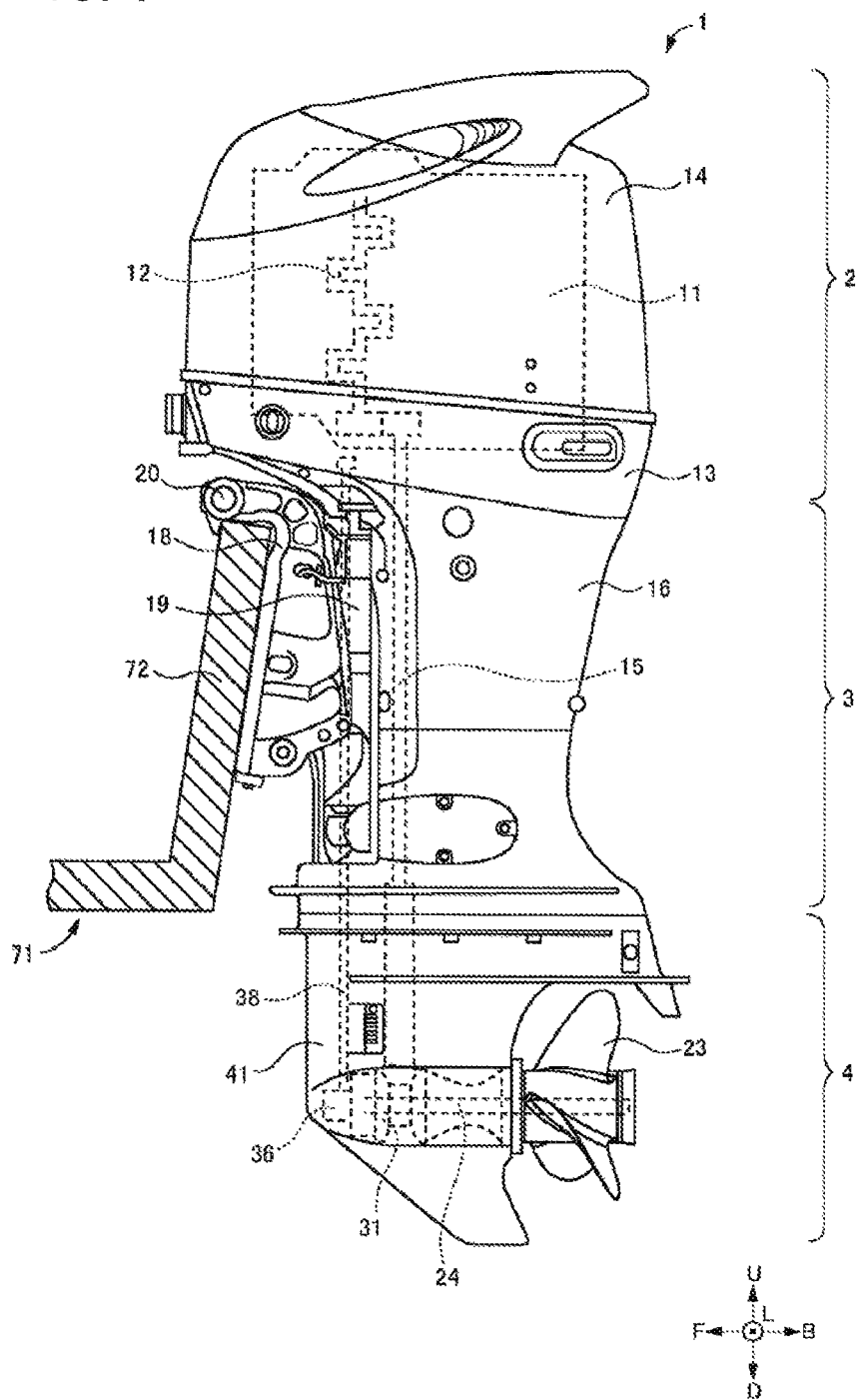
FIG. 1 is an explanatory view showing an outboard motor according to an embodiment of the present disclosure.

An outboard motor according to a first embodiment of the present disclosure includes an engine (internal combustion engine, electric motor, and the like), a propeller shaft that is provided below the engine and extends in a front-back direction, a drive shaft that extends in an up-down direction between the engine and the propeller shaft and is configured to transmit power of the engine to the propeller shaft, a gear device that is configured to transmit rotation of the drive shaft to the propeller shaft, a shift device that is configured to switch a rotation direction of the propeller shaft, and a case that accommodates the gear device and the shift device.

In the outboard motor according to the first embodiment of the present disclosure, the gear device includes a drive gear configured to rotate with an axis of the drive shaft as a rotation axis, a forward gear configured to rotate with an axis of the propeller shaft as a rotation axis and transmit the rotation of the drive shaft to the propeller shaft to rotate the propeller shaft in a positive direction, and a reverse gear configured to rotate with the axis of the propeller shaft as a rotation axis and transmit the rotation of the drive shaft to the propeller shaft to rotate the propeller shaft in a reverse direction. The shift device has, for example, a clutch, and selects, between the forward gear and the reverse gear, a gear that transmits the rotation of the drive gear to the propeller shaft by switching the clutch, so as to set a rotation direction of the propeller shaft.

In the outboard motor according to the first embodiment of the present disclosure, a gear chamber accommodating the gear device and a shift chamber accommodating the shift device are provided in the case. Further, for example, the gear chamber and the shift chamber store oil that lubricates and cools the drive gear, the forward gear, the reverse gear, the clutch, a bearing that rotatably supports the propeller shaft, and the like. Further, an oil circulation mechanism for circulating the oil in the gear chamber and the shift chamber is provided in the case. Further, the oil circulation mechanism includes an oil passage that communicates with the gear chamber and the shift chamber with each other and through which the oil flows from the shift chamber to the gear chamber.

In the outboard motor according to the first embodiment of the present disclosure, on an upper wall surface of the gear chamber, a circular recessed portion having a substantially circular opening portion and accommodating the drive gear is formed. Further, a rectangular recessed portion having a substantially rectangular opening portion and communicating with the circular recessed portion is formed in a portion of the upper wall surface of the gear chamber adjacent to the circular recessed portion. Further, the rectangular recessed portion includes a first side wall surface facing the circular recessed portion, a second side wall surface located on a reverse side of a rotation direction of the drive gear with respect to the first side wall surface, and a third side wall surface located on a side of the rotation direction of the drive gear with respect to the first side wall surface. Further, both the opening portion of the circular recessed portion and the opening portion of the rectangular recessed portion face the gear chamber.

In the outboard motor according to the first embodiment of the present disclosure, an inlet of the oil passage opens into the shift chamber. Further, an outlet of the oil passage opens into the gear chamber. Specifically, the outlet of the oil passage is formed on the first side wall surface of the rectangular recessed portion. Further, the outlet of the oil passage is arranged on the first side wall surface of the rectangular recessed portion at a position closer to the second side wall surface of the rectangular recessed portion than to the third side wall surface of the rectangular recessed portion. Further, for example, the inlet of the oil passage is arranged at a position higher than the outlet of the oil passage, and the oil passage is inclined downward from the inlet to the outlet. The oil flowed into the oil passage moves by gravity toward the outlet of the oil passage.

When the outboard motor is in operation, the oil circulates in the gear chamber and the shift chamber via the oil circulation mechanism. During the oil circulation process, the oil moves from the shift chamber to the gear chamber through the oil passage. Further, when the outboard motor is in operation, the drive shaft rotates by driving of the engine, the drive gear rotates accordingly, and the forward gear and the reverse gear rotate accordingly. At this time, when the forward gear is selected as the gear that transmits the rotation of the drive gear to the propeller shaft by the shift device, the propeller shaft rotates in the positive direction. On the other hand, when the reverse gear is selected as the gear that transmits the rotation of the drive gear to the propeller shaft by the shift device, the propeller shaft rotates in the reverse direction. Further, when the outboard motor is in operation, the oil stored in the gear chamber is stirred by the rotating drive gear, forward gear, and reverse gear. A complex flow of the oil is formed in the gear chamber by the stirring of the oil, and the complex flow includes the following forms of flow.

That is, the oil stored in the gear chamber is pumped up by teeth of the rotating forward gear and the rotating reverse gear. The pumped oil hits the rotating drive gear. The oil hit the drive gear temporarily accumulates between the teeth of the drive gear, and then is pushed out toward the side of the rotation direction of the drive gear by the teeth of the rotating drive gear substantially along tangents to a circle passing through the outermost peripheral portion of the drive gear.

When the direction in which the oil is pushed out toward the side of the rotation direction of the drive gear by the teeth of the rotating drive gear substantially along the tangents to the circle passing through the outermost peripheral portion of the drive gear is referred to as an "oil push-out direction", the oil pushed out by the teeth of the rotating drive gear easily hits, among the side wall surface of the circular recessed portion around the drive gear, and side wall surfaces of the rectangular recessed portion, portions that are opposed to the oil push-out direction, and does not easily hit portions that are not opposed to the oil push-out direction.

Among the side wall surface of the circular recessed portion around the drive gear, and side wall surfaces of the rectangular recessed portion, the portions that are opposed to the oil push-out direction are the side wall surface of the circular recessed portion, the third side wall surface of the rectangular recessed portion, and a portion on the first side wall surface of the rectangular recessed portion which is closer to the third side wall surface than to the second side wall surface. Further, among the side wall surface of the circular recessed portion around the drive gear, and the side wall surfaces of the rectangular recessed portion, the portions that are not opposed to the oil push-out direction are the second side wall surface of the rectangular recessed portion, and a portion on the first side wall surface of the rectangular recessed portion which is closer to the second side wall surface than to the third side wall surface. Therefore, the oil pushed out by the teeth of the rotating drive gear easily hits the side wall surface of the circular recessed portion, the third side wall surface of the rectangular recessed portion, and the portion on the first side wall surface of the rectangular recessed portion which is closer to the third side wall surface than to the second side wall surface. On the other hand, the oil pushed out by the teeth of the rotating drive gear do not easily hit the second side wall surface of the rectangular recessed portion, and the portion on the first side wall surface of the rectangular recessed portion which is closer to the second side wall surface than to the third side wall surface.

The outlet of the oil passage is arranged on the first side wall surface of the rectangular recessed portion at a position closer to the second side wall surface than to the third side wall surface. Therefore, the oil pushed out by the teeth of the rotating drive gear does not easily hit the outlet of the oil passage.

The outlet of the oil passage is arranged on the first side wall surface of the rectangular recessed portion at a position where the oil pushed out from the teeth of the drive gear does not easily hit, so that the oil pushed out from the drive gear is prevented from flowing into the oil passage from the outlet of the oil passage and trying to flow backward in the oil passage. Further, the oil pushed out from the drive gear is prevented from staying near the outlet of the oil passage. Accordingly, it is possible to prevent the oil that is about to move from the shift chamber to the gear chamber through the oil passage from colliding with the oil that tries to flow backward in the oil passage, and it is possible to prevent the oil that is about to move from the shift chamber to the gear chamber through the oil passage from colliding with the oil staying near the outlet of the oil passage. As a result, the oil smoothly moves from the shift chamber to the gear chamber through the oil passage. By smoothing the movement of the oil in this way, it is possible to improve the circulation of the oil and increase the oil cooling efficiency.

Second Embodiment

An outboard motor according to a second embodiment of the present disclosure includes an engine, a propeller shaft, a drive shaft, a gear device, a shift device, and a case accommodating the gear device and the shift device, similarly to the outboard motor according to the first embodiment of the present disclosure. Further, the gear device in the outboard motor according to the second embodiment of the present disclosure includes a drive gear, a forward gear, and a reverse gear similarly to the gear device in the outboard motor according to the first embodiment of the present disclosure. Further, the shift device in the outboard motor according to the second embodiment of the present disclosure is configured similarly to the shift device in the outboard motor according to the first embodiment of the present disclosure.

In the outboard motor according to the second embodiment of the present disclosure, a gear chamber accommodating the gear device and a shift chamber accommodating the shift device are provided in the case. Further, for example, the gear chamber and the shift chamber store oil that lubricates and cools the drive gear, the forward gear, the reverse gear, the clutch, a bearing that rotatably supports the propeller shaft, and the like. Further, an oil circulation mechanism for circulating the oil in the gear chamber and the shift chamber is provided in the case. Further, the oil circulation mechanism includes an oil passage that communicates with the gear chamber and the shift chamber with each other and through which the oil flows from the shift chamber to the gear chamber.

In the outboard motor according to the second embodiment of the present disclosure, a circular recessed portion and a rectangular recessed portion are formed on an upper wall surface of the gear chamber, similarly to the outboard motor according to the first embodiment of the present disclosure. Further, the rectangular recessed portion in the outboard motor according to the second embodiment of the present disclosure has a first side wall surface, a second side wall surface and a third side wall surface, similarly to the rectangular recessed portion in the outboard motor according to the first embodiment of the present disclosure.

In the outboard motor according to the second embodiment of the present disclosure, an inlet of the oil passage opens into the shift chamber. Further, an outlet of the oil passage opens into the gear chamber. Specifically, the outlet of the oil passage is formed on the first side wall surface of the rectangular recessed portion. Further, when the upper wall surface of the gear chamber is viewed from below, assuming that a point at which an edge portion of the circular recessed portion intersects with an edge portion of the second side wall surface of the rectangular recessed portion is a point P, a circle passing through an outermost peripheral portion of the drive gear is a circle Q, and a tangent to the circle Q passing through the point P and being located on the reverse side of the rotation direction of the drive gear with respect to the point P is a straight line T, at least a part of the outlet of the bypass oil passage is located on the first side wall surface of the rectangular recessed portion at the reverse side of the rotation direction of the drive gear than the straight line T. Further, for example, the inlet of the oil passage is arranged at a position higher than the outlet of the oil passage, and the oil passage is inclined downward from the inlet to the outlet. The oil flowed into the oil passage moves by gravity toward the outlet of the oil passage.

When the outboard motor is in operation, the oil circulates in the gear chamber and shift chamber via the oil circulation mechanism, and during the oil circulation process, the oil moves from the shift chamber to the gear chamber through the oil passage. Further, when the outboard motor is in operation, the drive shaft, the forward gear and the reverse gear rotate, and the propeller shaft rotates in the positive direction or in the reverse direction, as in the case of the outboard motor according to the first embodiment of the present disclosure. Further, when the outboard motor is in operation, the oil stored in the gear chamber is stirred by the rotating drive gear, forward gear, and reverse gear. A complex flow of the oil is formed in the gear chamber by the stirring of the oil, and the complex flow includes the following forms of flow as in the case of the outboard motor according to the first embodiment of the present disclosure. That is, the oil stored in the gear chamber is pumped up by teeth of the rotating forward gear and the rotating reverse gear, and the pumped oil hits the rotating drive gear. The oil hit the drive gear temporarily accumulates between the teeth of the drive gear, and then is pushed out toward the side of the rotation direction of the drive gear by the teeth of the rotating drive gear substantially along tangents to a circle passing through the outermost peripheral portion of the drive gear.

When the direction in which the oil is pushed out toward the side of the rotation direction of the drive gear by the teeth of the rotating drive gear substantially along the tangents to the circle passing through the outermost peripheral portion of the drive gear is referred to as an "oil push-out direction", the oil pushed out by the teeth of the rotating drive gear easily hits, among the side wall surface of the circular recessed portion around the drive gear, and side wall surfaces of the rectangular recessed portion, portions that are opposed to the oil push-out direction, and does not easily hit portions that are not opposed to the oil push-out direction.

Among the side wall surface of the circular recessed portion around the drive gear, and the side wall surfaces of the rectangular recessed portion, the portions that are not opposed to the oil push-out direction are the second side wall surface of the rectangular recessed portion, and a portion of the first side wall surface of the rectangular recessed portion that is on the reverse side of the rotation direction of the drive gear than the straight line T. Therefore, the oil pushed out by the teeth of the rotating drive gear does not easily hit the second side wall surface of the rectangular recessed portion, and the portion of the first side wall surface of the rectangular recessed portion that is on the reverse side of the rotation direction of the drive gear than the straight line T.

At least a part of the outlet of the bypass oil passage is located on the reverse side of the rotation direction of the drive gear than the straight line T on the first side wall surface of the rectangular recessed portion. Therefore, the oil pushed out by the teeth of the rotating drive gear does not easily hit the outlet of the oil passage. Accordingly, it is possible to prevent the oil pushed out from the drive gear from flowing into the oil passage from the outlet of the oil passage and trying to flow backward in the oil passage. Further, the oil pushed out from the drive gear is prevented from staying near the outlet of the oil passage. Therefore, it is possible to prevent the oil that is about to move from the shift chamber to the gear chamber through the oil passage from colliding with the oil that tries to flow backward in the oil passage, and it is possible to prevent the oil that is about to move from the shift chamber to the gear chamber through the oil passage from colliding with the oil staying near the outlet of the oil passage. As a result, the oil smoothly moves from the shift chamber to the gear chamber through the oil passage. In this way, the circulation of the oil can be improved and the oil cooling efficiency can be improved.

An embodiment of an outboard motor according to the present disclosure will be described with reference to FIGS. 1 to 6. In the following description, when describing directions of up (U), down (D), front (F), back (B), left (L), and right (R) regarding a structure, an operation, and the like of the outboard motor, arrows drawn in the lower right of FIGS. 1 to 6 are followed.

(Outboard Motor)

FIG. 1 shows an outboard motor 1 according to an embodiment of the present disclosure. In FIG. 1, an upper unit 2 that forms an upper portion of the outboard motor 1 is provided with, for example, a 4-cycle multi-cylinder engine 11. The engine 11 is arranged such that an axial center of a crankshaft 12 extends in an up-down direction. The engine 11 is supported by an engine base and is covered with an upper cover 13 and a lower cover 14.

A drive shaft 15 and a middle case 16 that covers the drive shaft 15 are provided in a middle unit 3 that forms an intermediate portion in the up-down direction of the outboard motor 1. The drive shaft 15 is a shaft that transmits the power of the engine 11 provided at the upper portion of the outboard motor 1 to a propeller shaft 24 provided at the lower portion of the outboard motor 1. The drive shaft 15 extends in the up-down direction between the engine 11 and the propeller shaft 24, and an upper end portion of the drive shaft 15 is connected to the crankshaft 12 of the engine 11 via a gear and the like. Further, a lower end portion of the drive shaft 15 is connected to the propeller shaft 24 via a gear device 31.

The middle unit 3 is provided with a clamp bracket 18 and a swivel bracket 19 for supporting the outboard motor 1 on a boat hull 71. The clamp bracket 18 is fixed to a stern plate 72 of the boat hull 71, and the swivel bracket 19 is connected to the clamp bracket 18 via a tilt shaft 20. The swivel bracket 19 also supports a steering shaft. Although the illustration is omitted, the steering shaft extends in the up-down direction, and both end portions thereof are connected to a front portion of the middle unit 3 via a connection bracket, and the swivel bracket 19 rotatably supports the steering shaft. With this structure, the outboard motor 1 can be rotated in the horizontal direction with respect to the boat hull 71. Further, the swivel bracket 19 can be rotated in the up-down direction with respect to the clamp bracket 18 via the tilt shaft 20. As a result, the outboard motor 1 can be tilted in the up-down direction with respect to the boat hull 71.

Figure 2:
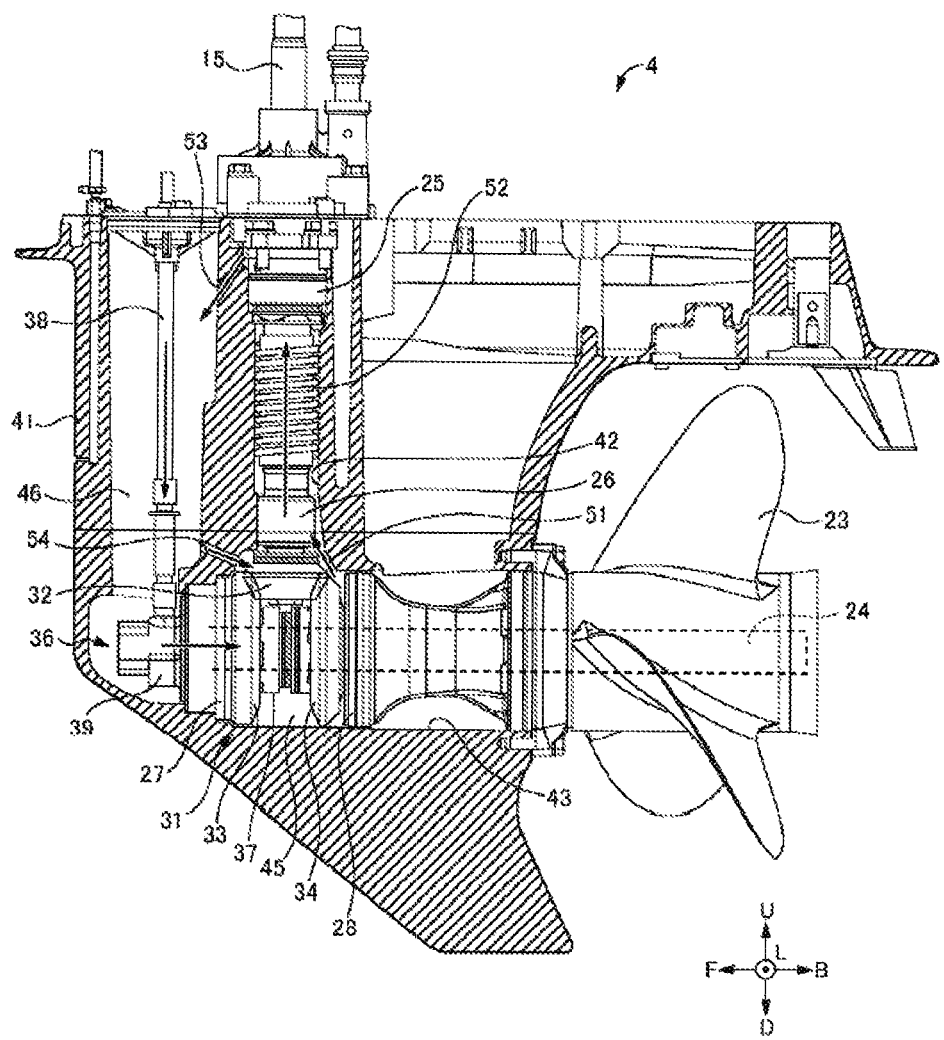
FIG. 2 is a sectional view showing a lower unit of the outboard motor according to the embodiment of the present disclosure.

FIG. 2 shows a cross section of the lower unit 4 that forms the lower portion of the outboard motor 1, taken along a plane extending in the up-down direction and a front-back direction and passing through the center of the lower unit 4 in a left-right direction. In FIG. 2, the lower unit 4 is provided with a propeller 23 that forms a propulsive force of the boat hull, the propeller shaft 24 that forms a rotation axis of the propeller 23, the gear device 31 that transmits the rotation of the drive shaft 15 to the propeller shaft 24, and a shift device 36 that switches a rotation direction of the propeller shaft 24.

The lower unit 4 is provided with a lower case 41 that accommodates a lower end side portion of the drive shaft 15, the propeller shaft 24, the gear device 31, and the shift device 36. In the lower case 41, there are provided a drive shaft insertion portion 42 through which the lower end side portion of the drive shaft 15 is inserted, a propeller shaft insertion portion 43 through which the propeller shaft 24 is inserted, a gear chamber 45 accommodating the gear device 31, and a shift chamber 46 accommodating a lower end side portion of a shift rod 38 in the shift device 36 and a shift mechanism 39. The drive shaft insertion portion 42 extends in the up-down direction from an upper portion of the lower case 41 toward the lower side. The propeller shaft insertion portion 43 extends in the front-back direction at a lower portion of the lower case 41. The gear chamber 45 is located below the drive shaft insertion portion 42, and is arranged in a front portion of the propeller shaft insertion portion 43. The shift chamber 46 is arranged in front of the drive shaft insertion portion 42 and the gear chamber 45.

The lower end side portion of the drive shaft 15 is rotatably supported in the drive shaft insertion portion 42 via bearings 25 and 26 provided on an upper end side and a lower end side of the drive shaft insertion portion 42, respectively.

The propeller shaft 24 extends in the front-back direction, and the propeller 23 is connected to a back end portion of the propeller shaft 24. Further, a front portion of the propeller shaft 24 reaches the inside of the gear chamber 45. The propeller shaft 24 is rotatably supported in the propeller shaft insertion portion 43 via bearings 27, 28 and the like provided in the propeller shaft insertion portion 43.

The gear device 31 has a drive gear 32, a forward gear 33, and a reverse gear 34. The drive gear 32, the forward gear 33, and the reverse gear 34 are all bevel gears. In the present embodiment, helical bevel gears are used as these gears, but bevel gears whose teeth extend linearly in a radial direction can also be used as these gears.

The drive gear 32 is fixed to the lower end portion of the drive shaft 15, and is arranged in an upper portion of the gear chamber 45. The drive gear 32 rotates with the drive shaft 15 with an axis of the drive shaft 15 as a rotation axis.

The forward gear 33 is provided on an outer peripheral side of the propeller shaft 24 in a state of being separated from the propeller shaft 24, and is arranged at a front portion in the gear chamber 45. The forward gear 33 usually meshes with the drive gear 32, and rotates with an axis of the propeller shaft 24 as a rotation axis as the drive gear 32 rotates.

The reverse gear 34 is provided on the outer peripheral side of the propeller shaft 24 in a state of being separated from the propeller shaft 24, and is arranged at a back portion in the gear chamber 45. The reverse gear 34 usually meshes with the drive gear 32, and rotates with the axis of the propeller shaft 24 as a rotation axis as the drive gear 32 rotates.

The shift device 36 selects a gear that transmits the rotation of the drive gear 32 to the propeller shaft 24 among the forward gear 33 and the reverse gear 34 according to the operation of a lever of a remote controller (hereinafter, abbreviated as "remote control") connected to the outboard motor 1 or a shift lever provided on the outboard motor 1, so as to set the rotation direction of the propeller shaft 24. The shift device 36 has a clutch 37, the shift rod 38, and the shift mechanism 39.

The clutch 37 is arranged in the gear chamber 45 between the forward gear 33 and the reverse gear 34, integrally rotates with the propeller shaft 24, and is slidable in the front-back direction with respect to the propeller shaft 24.

The shift rod 38 is arranged in front of the drive shaft 15 and extends in the up-down direction. When the outboard motor 1 has a remote control, an electric actuator that is remotely controlled by operating a lever of the remote control is provided on an upper portion of the middle unit 3, and an upper end portion of the shift rod 38 is connected to the electric actuator. When the outboard motor 1 does not have a remote control, the upper end portion of the shift rod 38 is connected to the shift lever provided on the middle unit 3. Further, a lower end portion of the shift rod 38 is connected to the shift mechanism 39 in the shift chamber 46.

The shift mechanism 39 is a mechanism for sliding the clutch 37 in the front-back direction according to the rotation of the shift rod 38, and is arranged in a lower portion of the shift chamber 46.

When the lever of the remote control or the shift lever is switched to a forward position, the shift rod 38 accordingly rotates in one direction around the axis thereof, and the shift mechanism 39 accordingly slides the clutch 37 forward. As a result, the clutch 37 is connected to the forward gear 33, the rotation of the drive shaft 15 is transmitted to the propeller shaft 24 via the forward gear 33 and the clutch 37, and the propeller shaft 24 rotates in a positive direction. On the other hand, when the lever of the remote control or the shift lever is switched to a reverse position, the shift rod 38 accordingly rotates in the other direction around the axis thereof, and the shift mechanism 39 accordingly slides the clutch 37 backward. As a result, the clutch 37 is connected to the reverse gear 34, the rotation of the drive shaft 15 is transmitted to the propeller shaft 24 via the reverse gear 34 and the clutch 37, and the propeller shaft 24 rotates in a reverse direction. When the lever of the remote control or shift lever is switched to a neutral position, the clutch 37 is not connected to either the forward gear 33 or the reverse gear 34, and the rotation of the drive shaft 15 is not transmitted to the propeller shaft 24.

(Oil Circulation Mechanism)

In FIG. 2, the lower case 41 is provided with an oil circulation mechanism. The oil circulation mechanism is a mechanism for circulating oil (lubricating oil) in the gear chamber 45, the drive shaft insertion portion 42, and the shift chamber 46. The oil is stored in the gear chamber 45 and the shift chamber 46, and the oil circulation mechanism supplies the oil to the bearings 25 and 26 that support the drive shaft 15, the bearings 27 and 28 that support the propeller shaft 24, the drive gear 32, the forward gear 33, the reverse gear 34, the clutch 37, and the like so as to lubricate and cool them.

The oil circulation mechanism includes a lower oil passage 51 that communicates the gear chamber 45 with a lower end portion of the drive shaft insertion portion 42, a spiral recessed groove 52 formed on an outer peripheral surface of the lower end side portion of the drive shaft 15, an upper oil passage 53 that communicates with the drive shaft insertion portion 42 and the shift chamber 46 in the upper portion of the lower case 41, and a bypass oil passage 54 that communicates with the shift chamber 46 and the gear chamber 45 in the lower portion of the lower case 41. The bypass oil passage 54 is a specific example of "oil passage" in the claims.

The lower oil passage 51 is a recessed groove or a notch formed in a part of an inner peripheral surface of the lower end portion of the drive shaft insertion portion 42.

The lower end side portion of the drive shaft 15 in which the spiral recessed groove 52 is formed functions as a screw pump.

The upper oil passage 53 is a hole formed in a wall portion that separates the drive shaft insertion portion 42 and the shift chamber 46 in the upper portion of the lower case 41. The upper oil passage 53 is configured such that an inlet thereof opening in the drive shaft insertion portion 42 is arranged at a position higher than an outlet thereof opening in the shift chamber 46, and the upper oil passage 53 is inclined downward from the drive shaft insertion portion 42 toward the shift chamber 46.

The bypass oil passage 54 is a hole formed in a wall portion that separates the shift chamber 46 and the gear chamber 45 in the lower portion of the lower case 41. The bypass oil passage 54 is configured such that an inlet 54A thereof opening in the shift chamber 46 is arranged at a position higher than an outlet 54B thereof opening in the gear chamber 45, and the bypass oil passage 54 is inclined downward from the shift chamber 46 toward the gear chamber 45 (see FIG. 3).

When the outboard motor 1 is in operation, the drive shaft 15 is rotated by the drive of the engine 11, and the drive gear 32, the forward gear 33, and the reverse gear 34 are rotated. When the clutch 37 is connected to the forward gear 33, the propeller shaft 24 rotates in the positive direction, and when the clutch 37 is connected to the reverse gear 34, the propeller shaft 24 rotates in the reverse direction. The oil stored in the gear chamber 45 is stirred by the rotation of the drive gear 32, the forward gear 33, and the reverse gear 34. As a result, the drive gear 32, the forward gear 33, the reverse gear 34, the clutch 37, the bearing 28, and the like are lubricated and cooled. Further, as the oil in the gear chamber 45 is stirred in this way, a part of the oil flows into the drive shaft insertion portion 42 through the lower oil passage 51. The bearing 26 is lubricated and cooled by the oil flowing into the drive shaft insertion portion 42.

The oil flowed into the drive shaft insertion portion 42 is carried to an upper side inside the drive shaft insertion portion 42 by the lower end side portion (recessed groove 52) of the drive shaft 15 that functions as a screw pump. The oil carried to the upper side in the drive shaft insertion portion 42 moves to an upper end portion in the drive shaft insertion portion 42 through a gap between an outer ring and an inner ring of the bearing 25 and the like. At this time, the bearing 25 is lubricated and cooled.

The oil that has moved to the upper end portion of the drive shaft insertion portion 42 flows into the upper oil passage 53, flows down in the upper oil passage 53 due to gravity, and flows into the shift chamber 46. The oil that has flowed into the shift chamber 46 flows down to the lower portion inside the shift chamber 46. The oil that has flowed down to the lower portion inside the shift chamber 46 flows into the gear chamber 45 through a gap between an outer ring and an inner ring of the bearing 27. At this time, the bearing 27 is lubricated and cooled.

A part of the oil that has flowed into the shift chamber 46 flows into the bypass oil passage 54 on the way of flowing down to the lower portion inside the shift chamber 46, flows down in the bypass oil passage 54 by gravity, and flows into the upper portion of the gear chamber 45. The drive gear 32 and the forward gear 33 are further lubricated and cooled by the oil that has flowed into the upper portion of the gear chamber 45 through the bypass oil passage 54.

In this way, when the outboard motor 1 is in operation, the oil stored in the gear chamber 45 and the shift chamber 46 is circulated in the order of the gear chamber 45, the drive shaft insertion portion 42, the shift chamber 46, and the gear chamber 45 by the oil circulation mechanism.

The oil removes heat from the bearings 25 to 28, the drive gear 32, the forward gear 33, the reverse gear 34, the clutch 37, and other members that generate heat, and as a result, the temperature of the oil rises. However, the oil is cooled by the lower case 41 while passing through the upper oil passage 53 and the bypass oil passage 54, for example. That is, since an outer surface of the lower case 41 is in contact with seawater and the like, the lower case 41 has a low temperature as a whole. When the oil passes through a circulation path of the oil away from the heat-generating members, the heat of the oil moves to the lower case 41, and the temperature of the oil is lowered.

(Structure Near Outlet of Bypass Oil Passage)

Figure 3:
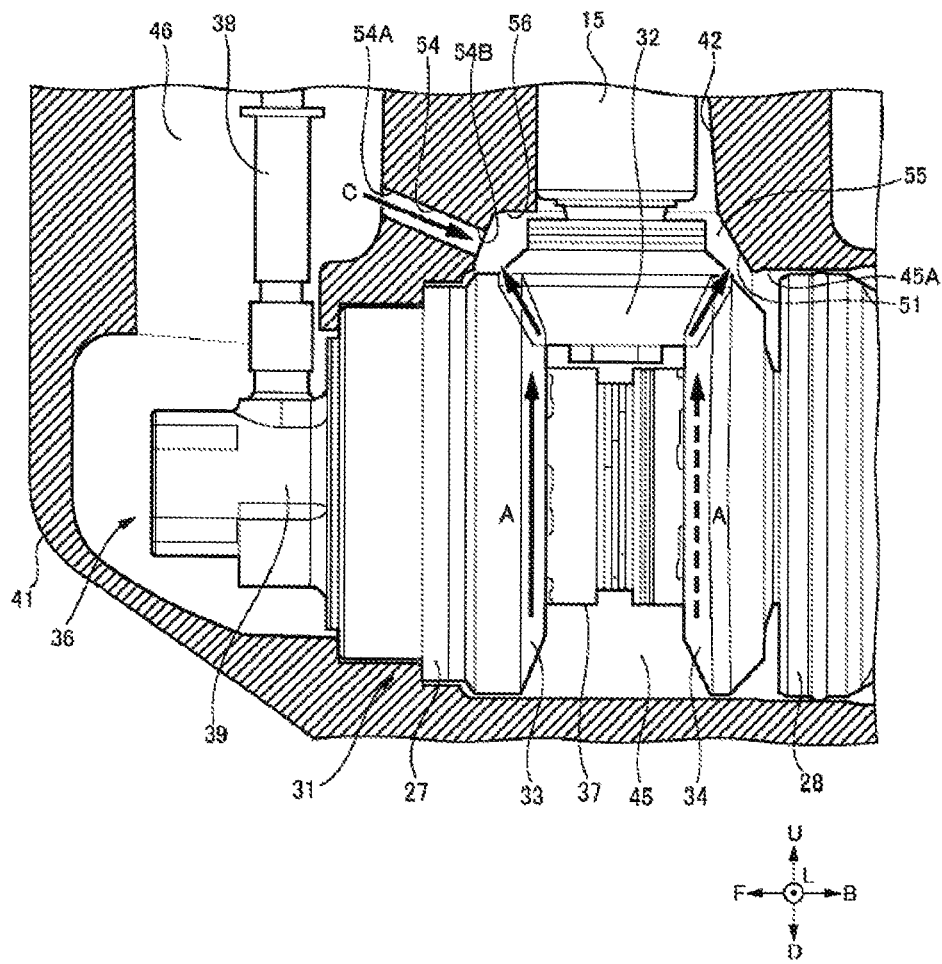
FIG. 3 is an enlarged sectional view showing a portion in which a bypass oil passage is formed and a peripheral portion thereof in the lower unit of the outboard motor according to the embodiment of the present disclosure.
Figure 4:
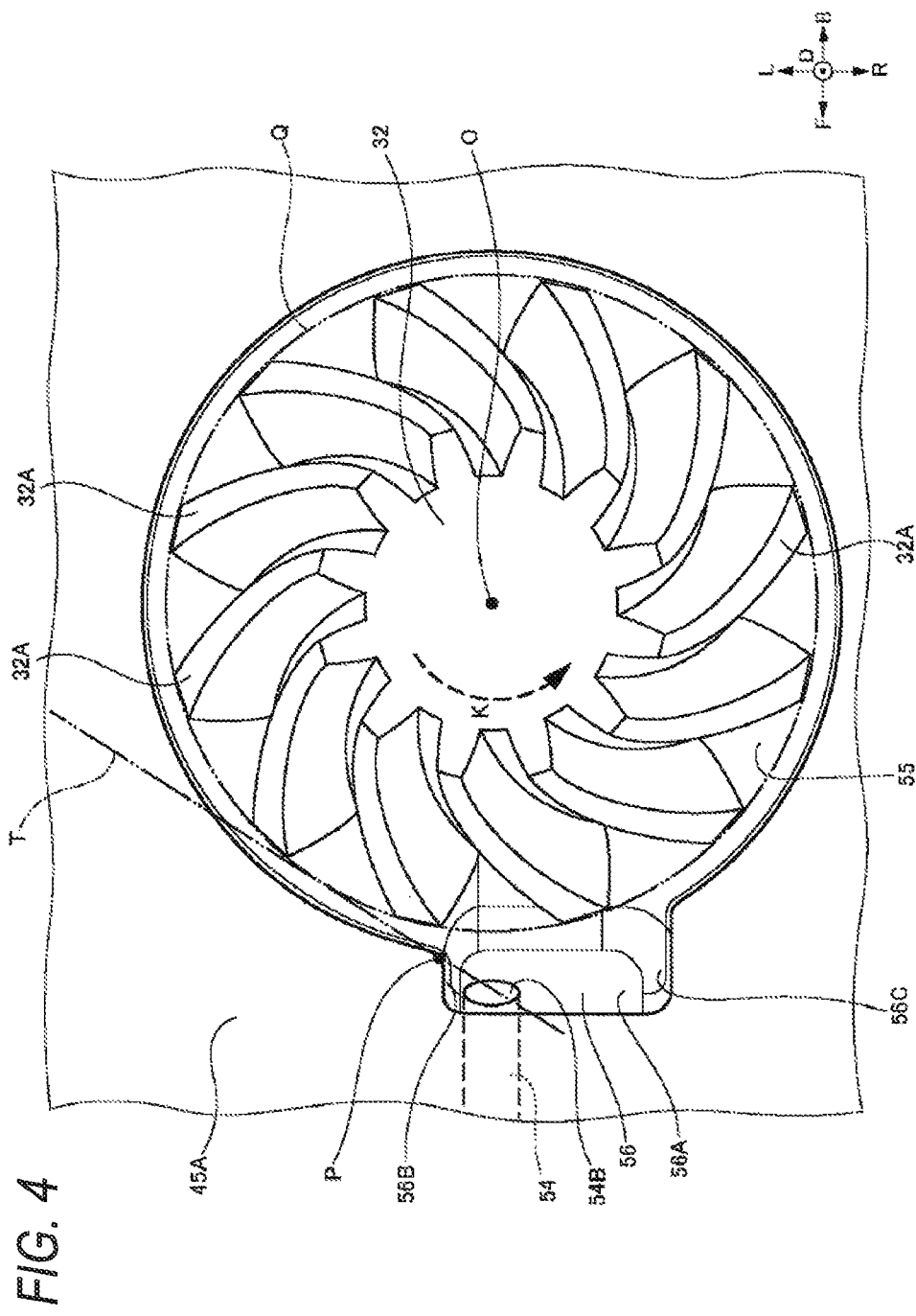
FIG. 4 is an explanatory view showing a state in which a drive gear and an upper portion of a gear chamber where an outlet of the bypass oil passage is located are viewed from below in the lower unit of the outboard motor according to the embodiment of the present disclosure.

Here, the structure near the outlet of the bypass oil passage 54 in the oil circulation mechanism of the outboard motor 1 will be described with reference to FIGS. 3 and 4. FIG. 3 is an enlarged view showing a portion in which the bypass oil passage 54 is formed and a peripheral portion thereof in the lower unit 4 in FIG. 2. FIG. 4 shows a state in which the drive gear 32 and the upper portion of the gear chamber 45 where the outlet of the bypass oil passage 54 is located are viewed from below. In FIG. 4, the propeller shaft 24, the bearings 27 and 28, the forward gear 33, the reverse gear 34, and the clutch 37 are removed for convenience of description. In addition, not that since the drive gear 32 and the like are viewed from below the outboard motor 1 in FIG. 4, the left and right are reversed as compared to the case where the drive gear 32 and the like is viewed from above the outboard motor 1.

As shown in FIG. 3, the gear chamber 45 has an upper wall surface 45A located on the upper portion of the gear chamber 45 and fronting the inside of the gear chamber 45. On the upper wall surface 45A, a circular recessed portion 55 having a shape recessed upward and opened downward is formed. As shown in FIG. 4, the circular recessed portion 55 has a substantially circular opening portion, and a back side portion of the drive gear 32 where teeth 32A are not formed is accommodated in the circular recessed portion 55. A diameter of the opening portion of the circular recessed portion 55 is larger than a diameter of the drive gear 32. The center O of the drive gear 32 coincides with the center of the opening portion of the circular recessed portion 55. In addition, the drive gear 32 is separated from a side wall surface (inner peripheral surface) and an upper wall surface (bottom surface) of the circular recessed portion 55.

As shown in FIG. 3, at a portion of the upper wall surface 45A of the gear chamber 45 adjacent to the circular recessed portion 55, a rectangular recessed portion 56 having a shape recessed upward and opened downward is formed. The rectangular recessed portion 56 is located in front of the circular recessed portion 55. Further, the rectangular recessed portion 56 communicates with the circular recessed portion 55.

As shown in FIG. 4, the rectangular recessed portion 56 has a substantially rectangular opening portion. Further, the rectangular recessed portion 56 has a front wall surface 56A as a first side wall surface, a left wall surface 56B as a second side wall surface, and a right wall surface 56C as a third side wall surface. Since a back portion of the rectangular recessed portion 56 communicates with the circular recessed portion 55, the rectangular recessed portion 56 does not have a back wall surface.

In the rectangular recessed portion 56, the front wall surface 56A faces the circular recessed portion 55. The drive gear 32 rotates in the direction of arrow K in FIG. 4 when viewed from below. In this case, the left wall surface 56B is located on a reverse side of the rotation direction of the drive gear 32 with respect to the front wall surface 56A, and the right wall surface 56C is located on a side of the rotation direction of the drive gear 32 with respect to the front wall surface 56A.

The outlet 54B of the bypass oil passage 54 is formed on the front wall surface 56A of the rectangular recessed portion 56. Further, the outlet 54B of the bypass oil passage 54 is arranged on the front wall surface 56A of the rectangular recessed portion 56 at a position closer to the left wall surface 56B than to the right wall surface 56C. Further, in FIG. 4, when the upper wall surface 45A of the gear chamber 45 is viewed from below, assuming that a point at which an edge portion of the circular recessed portion 55 intersects with an edge portion of the left wall surface 56B of the rectangular recessed portion 56 is a point P, a circle passing through an outermost peripheral portion of the drive gear 32 is a circle Q, and a tangent to the circle Q passing through the point P and being located on the reverse side of the rotation direction of the drive gear 32 with respect to the point P is a straight line T, at least a part of the outlet 54B of the bypass oil passage 54 is located on the front wall surface 56A of the rectangular recessed portion 56 at the reverse side of the rotation direction of the drive gear 32 than the straight line T. In the present embodiment, the edge portion of the circular recessed portion 55 corresponds to a boundary line between the upper wall surface 45A of the gear chamber 45 and the side wall surface of the circular recessed portion 55, and the edge portion of the left wall surface 56B of the rectangular recessed portion 56 corresponds to a boundary line between the upper wall surface 45A of the gear chamber 45 and the left wall surface 56B of the rectangular recessed portion 56.

In the left-right direction, the position of the outlet 54B of the bypass oil passage 54 coincides with the position of the center O of the drive gear 32. On the other hand, the position of the rectangular recessed portion 56 is displaced rightward with respect to the position of the center O of the drive gear 32, and the left wall surface 56B is closer to the outlet 54B of the bypass oil passage 54 than the right wall surface 56C.

The rectangular recessed portion 56 is a working seat on which a drilling tool such as a drill is installed when performing processing for forming the bypass oil passage 54 in the lower case 41 during manufacturing of the outboard motor 1.

In the embodiment of the present disclosure, the outlet 54B of the bypass oil passage 54 is arranged at a position closer to the left wall surface 56B than to the right wall surface 56C on the front wall surface 56A of the rectangular recessed portion 56, or at least a part of the outlet 54B of the bypass oil passage 54 is located on the reverse side of the rotation direction of the drive gear 32 than the straight line T on the front wall surface 56A of the rectangular recessed portion 56. With such a configuration, the oil pushed out by the teeth 32A of the drive gear 32 rotating in the direction of the arrow K is unlikely to hit the outlet 54B of the bypass oil passage 54.

Figure 5A:
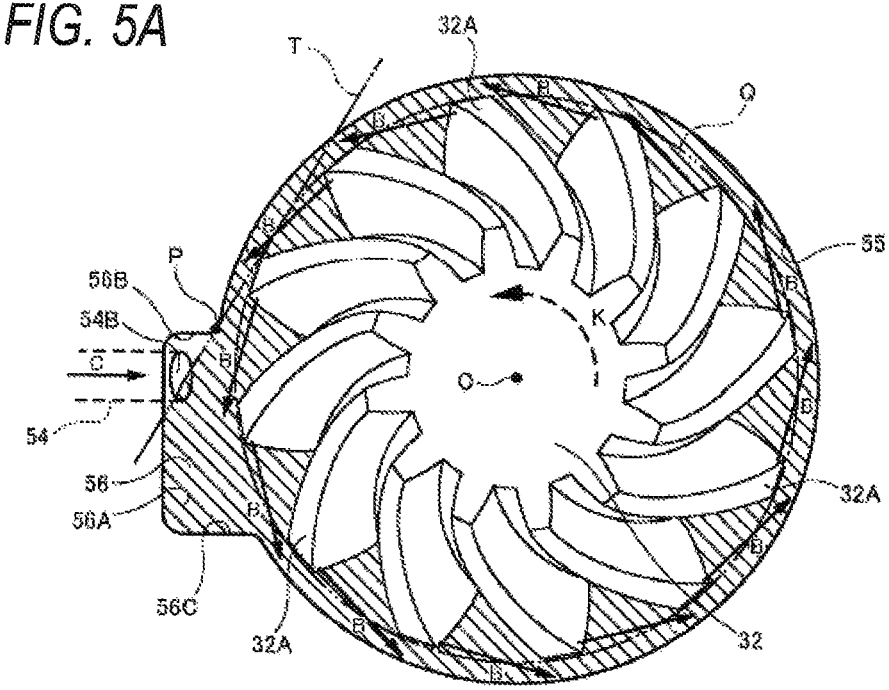
FIG. 5A is an explanatory view showing how difficult it is for oil to hit the outlet of the bypass oil passage in the outboard motor according to the embodiment of the present disclosure.
Figure 5B:
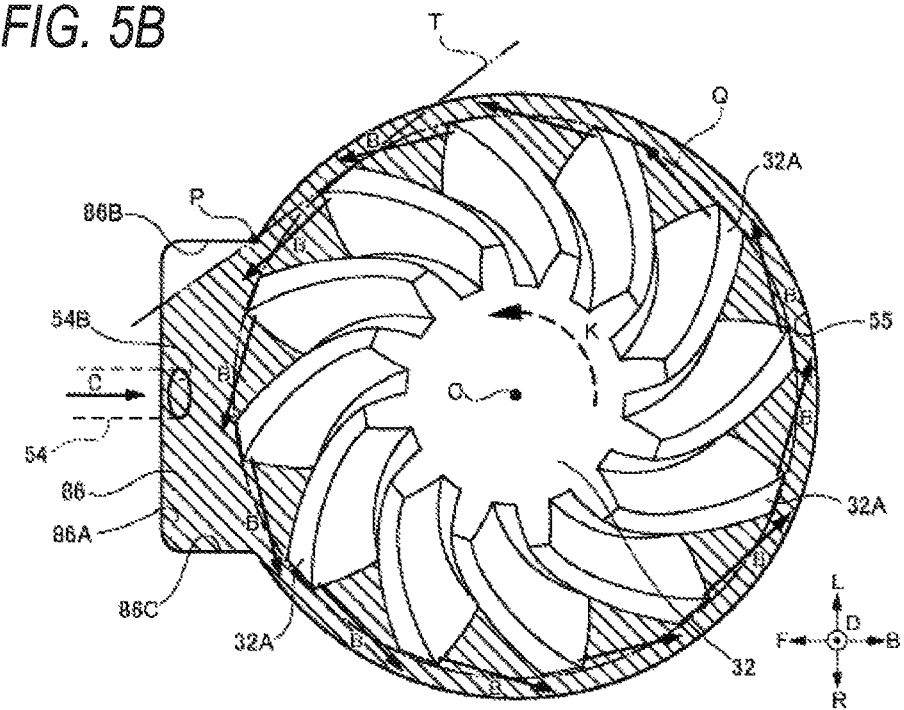
FIG. 5B is an explanatory view showing how easy it is for oil to hit the outlet of the bypass oil passage in the outboard motor according to a comparative example.

This principle will be described with reference to FIGS. 3, 5A and 5B. FIG. 5A schematically shows a state in which the drive gear 32 and the upper portion of the gear chamber 45 where the outlet 54B of the bypass oil passage 54 is located are viewed from below in the outboard motor 1 according to the embodiment of the present disclosure. FIG. 5B schematically shows a state in which the drive gear 32 and the upper portion of the gear chamber 45 where the outlet 54B of the bypass oil passage 54 is located are viewed from below in an outboard motor according to a comparative example.

As compared with the embodiment of the present disclosure shown in FIG. 5A, in the comparative example shown in FIG. 5B, a left wall surface 86B of a rectangular recessed portion 86 is separated from the outlet 54B of the bypass oil passage 54, and in the left-right direction, a distance between the outlet 54B of the bypass oil passage 54 and the left wall surface 86B is equal to a distance between the outlet 54B of the bypass oil passage 54 and a right wall surface 86C. That is, in the outboard motor according to the comparative example, the rectangular recessed portion 86 is expanded leftward, and as a result, the outlet 54B of the bypass oil passage 54 is located at the center of a front wall surface 86A of the rectangular recessed portion 86 in the left-right direction. Except for this point, the outboard motor according to the comparative example has the same configuration as the outboard motor 1 according to the embodiment of the present disclosure.

When the outboard motor 1 is in operation, the oil in the gear chamber 45 is stirred by the rotation of the drive gear 32, the forward gear 33, and the reverse gear 34. A complex flow of the oil is formed in the gear chamber 45 by the stirring of the oil, and the complex flow includes the following forms of flow.

That is, the oil stored in the gear chamber 45 is pumped up by the teeth of the rotating forward gear 33 and reverse gear 34 respectively, as shown by arrow A in FIG. 3. The pumped oil hits the rotating drive gear 32. The oil hit the drive gear 32 temporarily accumulates between the teeth 32A of the drive gear 32, and then is pushed out toward the side of the rotation direction of the drive gear 32 as shown by arrow B in FIGS. 5A and 5B by the teeth 32A of the rotating drive gear 32 substantially along tangents to the circle Q passing through the outermost peripheral portion of the drive gear 32.

When the direction in which the oil is pushed out toward the side of the rotation direction of the drive gear 32 by the teeth 32A of the rotating drive gear 32 substantially along the tangents to the circle Q passing through the outermost peripheral portion of the drive gear 32 is referred to as an "oil push-out direction", the oil pushed out by the teeth 32A of the rotating drive gear 32 easily hits, among the side wall surface of the circular recessed portion 55 around the drive gear 32, and the front wall surface 56A (86A), the left wall surface 56B (86B), and the right wall surface 56C (86C) of the rectangular recessed portion 56 (86), portions that are opposed to the oil push-out direction, and does not easily hit portions that are not opposed to the oil push-out direction.

In FIGS. 5A and 5B, among the side wall surface of the circular recessed portion 55 around the drive gear 32, and the front wall surface 56A (86A), the left wall surface 56B (86B), and the right wall surface 56C (86C) of the rectangular recessed portion 56 (86), the portions that are opposed to the oil push-out direction are hatched. As shown in FIGS. 5A and 5B, in both the embodiment of the present disclosure and the comparative example, the side wall surface of the circular recessed portion 55 and the right wall surface 56C (86C) of the rectangular recessed portion 56 (86) are the portions that are opposed to the oil push-out direction. Therefore, the oil pushed out by the teeth 32A of the rotating drive gear 32 easily hits the side wall surface of the circular recessed portion 55 and the right wall surface 56C (86C) of the rectangular recessed portion 56 (86). On the other hand, in both the example of the present disclosure and the comparative example, the left wall surface 56B (86B) of the rectangular recessed portion 56 (86) is the portion that is not opposed to the oil push-out direction. Therefore, the oil pushed out by the teeth 32A of the rotating drive gear 32 does not easily hit the left wall surface 56B (86B) of the rectangular recessed portion 56 (86).

As shown in FIGS. 5A and 5B, in both the embodiment of the present disclosure and the comparative example, a portion of the front wall surface 56A (86A) of the rectangular recessed portion 56 (86) that is closer to the right wall surface 56C (86C) than to the left wall surface 56B (86B), or a portion of the front wall surface 56A (86A) that is on the side of the rotation direction of the drive gear 32 than the straight line T is the portion that is opposed to the oil push-out direction. Therefore, the oil pushed out by the teeth 32A of the rotating drive gear 32 easily hits the portion of the front wall surface 56A (86A) of the rectangular recessed portion 56 (86) that is closer to the right wall surface 56C (86C) than to the left wall surface 56B (86B), or the portion of the front wall surface 56A (86A) that is on the side of the rotation direction of the drive gear 32 than the straight line T. On the other hand, in both the embodiment of the present disclosure and the comparative example, a portion of the front wall surface 56A (86A) of the rectangular recessed portion 56 (86) that is closer to the left wall surface 56B (86B) than to the right wall surface 56C (86C), or a portion of the front wall surface 56A (86A) that is on the reverse side of the rotation direction of the drive gear 32 than the straight line T is the portion that is not opposed to the oil push-out direction. Therefore, the oil pushed out by the teeth 32A of the rotating drive gear 32 does not easily hit the portion of the front wall surface 56A (86A) of the rectangular recessed portion 56 (86) that is closer to the left wall surface 56B (86B) than to the right wall surface 56C (86C), or the portion of the front wall surface 56A (86A) that is on the reverse side of the rotation direction of the drive gear 32 than the straight line T.

In the embodiment of the present disclosure, as shown in FIG. 5A, the outlet 54B of the bypass oil passage 54 is arranged at the position closer to the left wall surface 56B than to the right wall surface 56C on the front wall surface 56A of the rectangular recessed portion 56, or at least a part of the outlet 54B of the bypass oil passage 54 is located at the portion on the reverse side of the rotation direction of the drive gear 32 than the straight line T on the front wall surface 56A. Therefore, the oil pushed out by the teeth 32A of the rotating drive gear 32 does not easily hit the outlet 54B of the bypass oil passage 54 in the embodiment of the present disclosure.

On the other hand, in the comparative example, as shown in FIG. 5B, the outlet 54B of the bypass oil passage 54 is arranged at the center of the front wall surface 86A of the rectangular recessed portion 86 in the left-right direction, or the entire outlet 54B of the bypass oil passage 54 is located at a portion on the side of the rotation direction of the drive gear 32 than the straight line T on the front wall surface 86A. Therefore, the oil pushed out by the teeth 32A of the rotating drive gear 32 easily hits the outlet 54B of the bypass oil passage 54 in the comparative example.

When the outboard motor 1 is in operation, the oil that has flown down into the shift chamber 46 flows into the bypass oil passage 54 and flows down in the bypass oil passage 54 due to gravity in the direction of arrow C in FIGS. 3, 5A and 5B toward the gear chamber 45. In the embodiment of the present disclosure, the oil pushed out by the teeth 32A of the rotating drive gear 32 does not easily hit the outlet 54B of the bypass oil passage 54, so that the stirred oil in the gear chamber 45 is prevented from flowing into the bypass oil passage 54 from the outlet 54B of the bypass oil passage 54 and trying to flow backward in the bypass oil passage 54 against gravity. Further, the stirred oil in the gear chamber 45 is prevented from staying near the outlet 54B of the bypass oil passage 54. Therefore, it is possible to prevent the oil flowing in the bypass oil passage 54 from the shift chamber 46 toward the gear chamber 45 from colliding with the oil that tries to flow backward from the gear chamber 45 toward the shift chamber 46 in the bypass oil passage 54, and it is possible to prevent the oil flowing in the bypass oil passage 54 from the shift chamber 46 toward the gear chamber 45 from colliding with the oil staying near the outlet 54B of the bypass oil passage 54. As a result, the oil can be smoothly moved from the shift chamber 46 to the gear chamber 45 via the bypass oil passage 54.

On the other hand, in the comparative example, the oil pushed out by the teeth 32A of the rotating drive gear 32 easily hits the outlet 54B of the bypass oil passage 54. For this reason, the phenomenon that the stirred oil in the gear chamber 45 flows into the bypass oil passage 54 from the outlet 54B of the bypass oil passage 54 and tries to flow backward in the bypass oil passage 54 against gravity, or the phenomenon that the stirred oil in the gear chamber 45 stays near the outlet 54B of the bypass oil passage 54 is likely to occur. When such a phenomenon occurs, the oil flowing in the bypass oil passage 54 from the shift chamber 46 toward the gear chamber 45 frequently collides with the oil that tries to flow backward from the gear chamber 45 toward the shift chamber 46 in the bypass oil passage 54, or with the oil staying near the outlet 54B of the bypass oil passage 54. As a result, the oil cannot be smoothly moved from the shift chamber 46 to the gear chamber 45 via the bypass oil passage 54.

As described above, according to the outboard motor 1 according to the embodiment of the present disclosure, the outlet 54B of the bypass oil passage 54 is arranged at the position closer to the left wall surface 56B than to the right wall surface 56C on the front wall surface 56A of the rectangular recessed portion 56, or at least a part of the outlet 54B of the bypass oil passage 54 is located at the portion on the reverse side of the rotation direction of the drive gear 32 than the straight line T on the front wall surface 56A of the rectangular recessed portion 56, so that the oil can be smoothly moved from the shift chamber 46 to the gear chamber 45 via the bypass oil passage 54 when the outboard motor 1 is in operation. Accordingly, the circulation of the oil can be improved, the oil cooling efficiency can be enhanced, and the life of the oil can be prolonged. Further, by improving the circulation of the oil, the lubricating effect of the oil on the bearings 25 to 28, the drive gear 32, the forward gear 33, the reverse gear 34, the clutch 37, and the like can be enhanced. Further, by enhancing the oil cooling efficiency, the cooling effect of the oil on the bearings 25 to 28, the drive gear 32, the forward gear 33, the reverse gear 34, the clutch 37, and the like can be enhanced. Further, according to the outboard motor 1 of the embodiment of the present disclosure, the oil can be smoothly moved from the shift chamber 46 to the gear chamber 45 without adding a pump and the like for pumping the oil from the shift chamber 46 to the gear chamber 45. Therefore, it is possible to improve the oil cooling efficiency without increasing the number of parts or increasing the weight or cost of the outboard motor 1 due to the increase in parts.

In the outboard motor 1 according to the embodiment of the present disclosure, it is preferable that half or more of the outlet 54B of the bypass oil passage 54 is located on the reverse side of the rotation direction of the drive gear 32 than the straight line T on the front wall surface 56A of the rectangular recessed portion 56. Accordingly, it becomes more difficult for the oil pushed out by the teeth 32A of the rotating drive gear 32 to hit the outlet 54B of the bypass oil passage 54, so that the smoothness of the movement of the oil from the shift chamber 46 to the gear chamber 45 via the bypass oil passage 54 can be reliably enhanced.

In the outboard motor 1 according to the embodiment of the present disclosure, the outlet 54B of the bypass oil passage 54 and the rectangular recessed portion 56 are arranged above the portion where the drive gear 32 and the forward gear 33 mesh with each other. With this configuration, the bypass oil passage 54 can be shortened, and the oil can be moved more smoothly from the shift chamber 46 to the gear chamber 45 via the bypass oil passage 54.

In the outboard motor 1 according to the embodiment of the present disclosure, the rectangular recessed portion 56 is a working seat for the processing of forming the bypass oil passage 54. That is, in the outboard motor 1 according to the embodiment of the present disclosure, by using the working seat for the processing of forming the bypass oil passage 54, the smooth movement of the oil from the shift chamber 46 to the gear chamber 45 via the bypass oil passage 54 is realized. Therefore, according to the embodiment of the present disclosure, the outboard motor 1 having excellent oil cooling performance and the like can be manufactured without increasing the number of manufacturing steps as compared with an outboard motor in related art.

Figure 6:
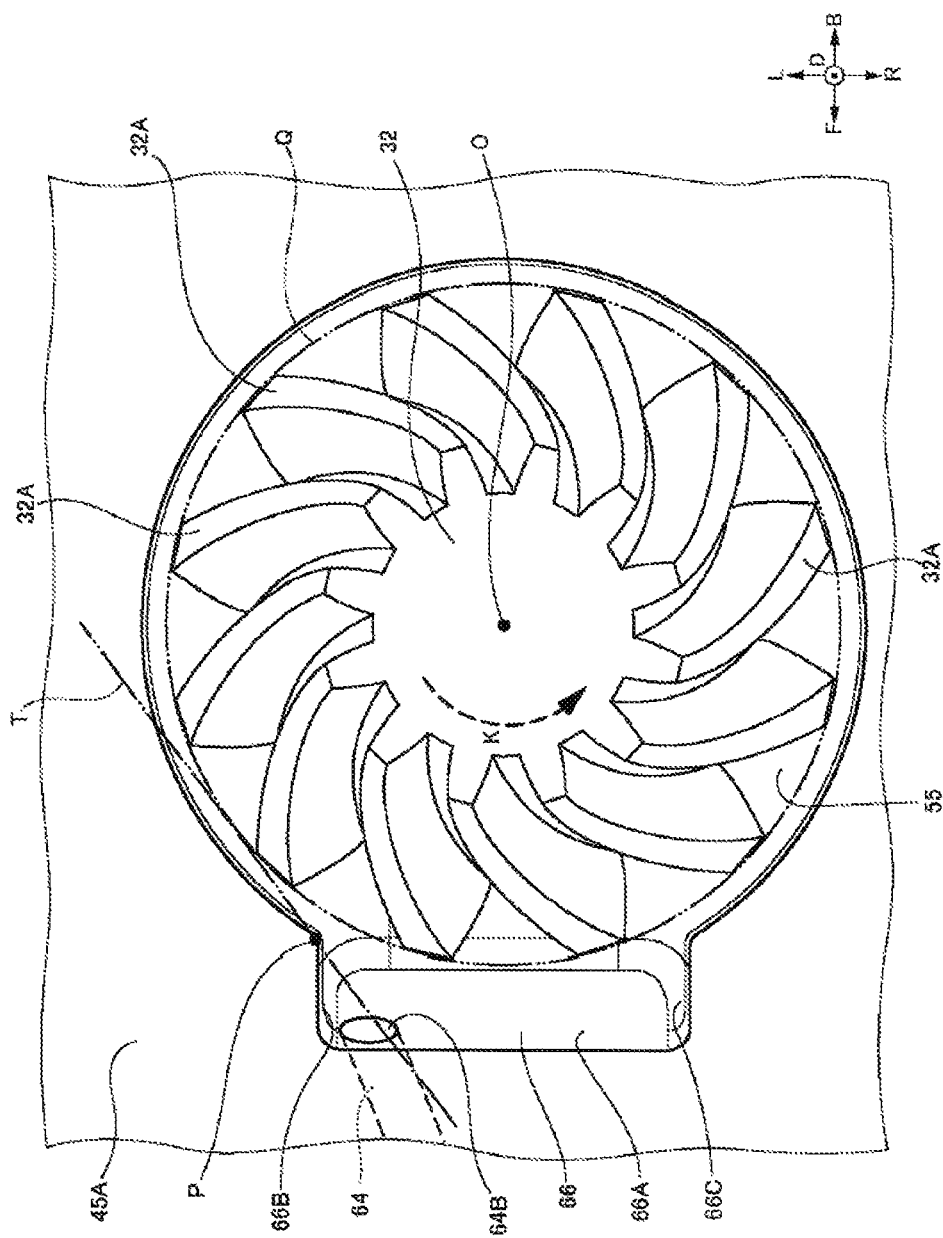
FIG. 6 is an explanatory view showing a state in which a drive gear and an upper portion of a gear chamber where an outlet of a bypass oil passage is located are viewed from below in a lower unit of an outboard motor according to another embodiment of the present disclosure.

In the above embodiment, as shown in FIG. 4, an example is given in which the position of the outlet 54B of the bypass oil passage 54 coincides with the position of the center O of the drive gear 32 in the left-right direction, and the position of the rectangular recessed portion 56 is displaced rightward with respect to the position of the center O of the drive gear 32. However, the present disclosure is not limited to this. For example, as shown in FIG. 6, in the left-right direction, a position of a rectangular recessed portion 66 may coincide with the position of the center O of the drive gear 32, a position of an outlet 64B of a bypass oil passage 64 may be displaced leftward with respect to the position of the center O of the drive gear 32, and the outlet 64B of the bypass oil passage 64 may be arranged on a front wall surface 66A of the rectangular recessed portion 66 at a position closer to a left wall surface 66B than to a right wall surface 66C.

In the above embodiment, the case where the drive gear 32 rotates in the direction of arrow K in FIG. 4 is described as an example, but the rotation direction of the drive gear 32 may be a direction reverse to the direction of arrow K. In this case, the outlet 54B of the bypass oil passage 54 is arranged on the front wall surface 56A of the rectangular recessed portion 56 at a position closer to the right wall surface 56C than to the left wall surface 56B.

In the above embodiment, the oil circulation mechanism having the lower oil passage 51, the recessed groove 52, the upper oil passage 53, and the bypass oil passage 54 is described as an example, but the number, arrangement and shape of the passages other than the bypass oil passage 54 are not limited in the oil circulation mechanism. Also, with respect to the bypass oil passage 54, a plurality of bypass oil passages 54 may be provided, and the outlet 54B of the bypass oil passage 54 and the rectangular recessed portion 56 may be arranged at a position that is not in front of the circular recessed portion 55.

In the above embodiment, the case where the rectangular recessed portion 56 is a working seat is described as an example, but the rectangular recessed portion 56 may not be a working seat.

The present disclosure can be modified as appropriate without departing from the scope or spirit of the disclosure which can be read from the claims and the entire specification, and the outboard motor accompanying such a change is also included in the technical concept of the present disclosure.

What is claimed is:

1. An outboard motor, comprising:
an engine;
a propeller shaft that is provided below the engine and extends in a front-back direction;
a drive shaft that extends in an up-down direction between the engine and the propeller shaft, and is configured to transmit power of the engine to the propeller shaft;
a gear device that includes a drive gear configured to rotate with an axis of the drive shaft as a rotation axis, a forward gear configured to rotate with an axis of the propeller shaft as a rotation axis and transmit rotation of the drive shaft to the propeller shaft to rotate the propeller shaft in a positive direction, and a reverse gear configured to rotate with the axis of the propeller shaft as a rotation axis and transmit the rotation of the drive shaft to the propeller shaft to rotate the propeller shaft in a reverse direction;
a shift device that is configured to select an either the forward gear or the reverse gear as a gear for transmitting the rotation of the drive gear to the propeller shaft, and set a rotation direction of the propeller shaft; and
a case that accommodates the gear device and the shift device, wherein
a gear chamber accommodating the gear device, a shift chamber accommodating the shift device, and an oil circulation mechanism configured to circulate oil in the gear chamber and the shift chamber are provided in the case,
the oil circulation mechanism includes an oil passage that communicates with the gear chamber and the shift chamber with each other, and through which the oil flows from the shift chamber to the gear chamber,
a circular recessed portion includes an opening portion having a circular shape, accommodates the drive gear, and is formed on an upper wall surface of the gear chamber,
a rectangular recessed portion includes an opening portion having a rectangular shape, communicates with the circular recessed portion, and is formed in a portion of the upper wall surface of the gear chamber adjacent to the circular recessed portion,
the rectangular recessed portion includes a first side wall surface facing a side surface of the circular recessed portion, a second side wall surface located on a reverse side of a rotation direction of the drive gear with respect to the first side wall surface, and a third side wall surface located on a side of the rotation direction of the drive gear with respect to the first side wall surface, and
an outlet of the oil passage is arranged on the first side wall surface at a position closer to the second side wall surface than to the third side wall surface.

2. An outboard motor, comprising:
an engine;
a propeller shaft that is provided below the engine and extends in a front-back direction;
a drive shaft that extends in an up-down direction between the engine and the propeller shaft, and is configured to transmit power of the engine to the propeller shaft;
a gear device that includes a drive gear configured to rotate with an axis of the drive shaft as a rotation axis, a forward gear configured to rotate with an axis of the propeller shaft as a rotation axis and transmit rotation of the drive shaft to the propeller shaft to rotate the propeller shaft in a positive direction, and a reverse gear configured to rotate with the axis of the propeller shaft as a rotation axis and transmit the rotation of the drive shaft to the propeller shaft to rotate the propeller shaft in a reverse direction;
a shift device that is configured to select an either the forward gear or the reverse gear as a gear for transmitting the rotation of the drive gear to the propeller shaft and set a rotation direction of the propeller shaft; and
a case that accommodates the gear device and the shift device, wherein
a gear chamber accommodating the gear device, a shift chamber accommodating the shift device, and an oil circulation mechanism configured to circulate oil in the gear chamber and the shift chamber are provided in the case,
the oil circulation mechanism includes an oil passage that communicates with the gear chamber and the shift chamber with each other, and through which the oil flows from the shift chamber to the gear chamber,
a circular recessed portion includes an opening portion having a circular shape, accommodates the drive gear, and is formed on an upper wall surface of the gear chamber,
a rectangular recessed portion includes an opening portion having a rectangular shape, communicates with the circular recessed portion, and is formed on a portion of the upper wall surface of the gear chamber adjacent to the circular recessed portion,
the rectangular recessed portion includes a first side wall surface facing a side surface of the circular recessed portion, a second side wall surface located on a reverse side of a rotation direction of the drive gear with respect to the first side wall surface, and a third side wall surface located on a side of the rotation direction of the drive gear with respect to the first side wall surface, and
when the upper wall surface of the gear chamber is viewed from below, assuming that a point at which an edge portion of the circular recessed portion intersects with an edge portion of the second side wall surface is a point P, a circle passing through an outermost peripheral portion of the drive gear is a circle Q, and a tangent to the circle Q passing through the point P and being located on the reverse side of the rotation direction of the drive gear with respect to the point P is a straight line T, at least a part of an outlet of the oil passage is located on the first side wall surface at the reverse side of the rotation direction of the drive gear than the straight line T.

3. The outboard motor according to claim 1, wherein
the outlet of the oil passage and the rectangular recessed portion are arranged above a portion where the drive gear and the forward gear mesh with each other.

4. The outboard motor according to claim 2, wherein
the outlet of the oil passage and the rectangular recessed
   portion are arranged above a portion where the drive
   gear and the forward gear mesh with each other.
5. The outboard motor according to claim 1, wherein
the rectangular recessed portion is a working seat on
   which a tool is installed for a processing of forming the
   oil passage.
6. The outboard motor according to claim 2, wherein
the rectangular recessed portion is a working seat on
   which a tool is installed for a processing of forming the
   oil passage.

\* \* \* \* \*